United States Patent [19]

Hoover

[11] Patent Number: 4,696,403

[45] Date of Patent: Sep. 29, 1987

[54] BOTTLE BAG

[75] Inventor: Gregory A. Hoover, Hartsville, S.C.

[73] Assignee: Sonoco Products Company, Hartsville, S.C.

[21] Appl. No.: 906,456

[22] Filed: Sep. 16, 1986

[51] Int. Cl.$^4$ ............................................. B65D 30/22
[52] U.S. Cl. .................................... 206/602; 206/428; 383/8; 383/37; 383/38
[58] Field of Search ................. 206/602, 427, 428; 383/8, 37, 38; 229/89

[56] References Cited

U.S. PATENT DOCUMENTS

| | | | |
|---|---|---|---|
| 1,510,243 | 9/1924 | Perry | 383/38 |
| 1,606,115 | 11/1926 | Williams | 383/38 |
| 2,301,087 | 11/1942 | Snyder | 229/89 |
| 2,805,814 | 9/1957 | Calasibetta et al. | 206/602 |
| 3,008,835 | 11/1961 | Madding | 206/602 |
| 3,114,496 | 12/1963 | Wilcox | 206/428 |
| 3,173,602 | 3/1965 | Clipner | 206/602 |
| 3,263,904 | 8/1966 | Warp | 206/602 |
| 3,332,548 | 7/1967 | Piazze et al. | 383/37 |
| 3,339,824 | 9/1967 | Luke . | |
| 3,448,915 | 6/1969 | Schwarzkopf | 383/37 |
| 4,125,220 | 11/1978 | Suominen | 383/37 |
| 4,164,170 | 8/1979 | Nordin | 383/8 |
| 4,290,525 | 9/1981 | Sisson | 206/427 |
| 4,299,324 | 11/1981 | Dickens . | |
| 4,542,826 | 9/1985 | Adams . | |
| 4,560,068 | 12/1985 | Membrino . | |
| 4,588,554 | 5/1986 | Kaartinen et al. . | |

FOREIGN PATENT DOCUMENTS 1059909  2/1967  United Kingdom .................. 383/37

Primary Examiner—Stephen P. Garbe
Attorney, Agent, or Firm—Dennison, Meserole, Pollack & Scheiner

[57] ABSTRACT

A flexible bag including front and rear walls vertically joined along a center line to form a pair of adjacent separated upwardly opening compartments. The front and rear bag walls have integral handles projecting upwardly therefrom, one handle in generally overlying relation to each compartment. The compartments, each with its associated handle, are selectively severable from each other along the vertical joinder line.

3 Claims, 3 Drawing Figures

BOTTLE BAG

BACKGROUND OF THE INVENTION

The invention is generally concerned with the bagging of glass containers, primarily bottles, wherein great care must be taken to avoiding direct contact between the bagged bottles such as might cause chipping or breakage. While the problem is not particularly significant in a grocery store environment wherein the glass containers for various foodstuffs use relatively thick glass and, in the bagging thereof, can normally be cushioned within other foodstuffs to avoid direct glass to glass contact, the problem is more acute in liquor stores and the like wherein the bulk of the products dispensed are in glass bottles. As such, while not limited thereto, it is contemplated that the present invention find particular utility as a bagging means or container for liquor bottles.

Under current practice, when two or more bottles are to be carried within a carrier or bag, the bottles are separated within the bag by individually wrapping the bottles prior to insertion in the bag, providing extra bags to receive the individual bottles, or by inserting cardboard dividers or the like between the bottles. While such means are effective to keep the bottles from hitting each other and breaking, the cost of the extra bags, dividers, and the like can be high, particularly in liquor stores wherein substantially every sale will entail the use of substantial packaging materials in addition to the carrying bag itself.

The problem of maintaining bottle separation within a carrying bag is recognized in the following patents wherein proposed solutions have involved the provision of rather elaborate permanent or removable partition structures:

U.S. Pat. No. 1,983,418, Thurmer
U.S. Pat. No. 2,089,297, Read et al
U.S. Pat. No. 4,428,484, Rattay et al

SUMMARY OF THE INVENTION

The bag construction of the present invention is unique in providing for bottle separation without requiring additional materials, separate partitions, extra bags, or the like.

Basically, the bottle carrier of the present invention comprises a flexible bag, preferably of autogenously bondable synthetic resin material as in the commonly used plastic or thermoplastic grocery sack, wherein the front and rear walls of the bag are bonded together along the vertical center line thereof. When formed in this manner, a pair of upwardly opening isolated compartments are defined toward each side of the bag. The typical thermoplastic grocery bag normally incorporates a pair of upwardly extending handles, defining what is frequently referred to as a "T-shirt" grocery bag. The defined compartments of the liquor bag of the present invention will each generally underlie one of the handles for a direct support of the load therein. This is particularly desirable to avoid a load imbalance.

It is also contemplated that provision be made for vertically severing the bag to separate the compartments, as would be desired in those instances where only a single bottle is to be bagged. In such cases, the provision for a handle in association with each of the compartments is particularly significant in defining a self-contained carrier unit.

Provision for separation of the compartments of a bag will normally be provided by incorporating a severance line or line of weakness, such as a line of perforations, vertically along the bonded area between the front and rear walls of the bag and centrally of the bonded area whereby upon a severing of the compartments, a bonded edge is retained along each compartment. In this manner, a complete carrier is retained.

It will be recognized that the significant advantages of a compartmented bag capable of being physically divided into multiple bag units with individual handles is achieved without the necessity of additional materials, internal partitions, or the like. In addition, assuming bags of thermoplastic material formed in the manner of the known plastic grocery bag, the formation of the bag of the present invention can be effected on standard manufacturing equipment with minor modifications to accommodate, as an example, a central vertical heat seaming or sealing of the front and rear walls of the bag together, in conjunction with means for defining a line of perforations centrally along the heat seam.

Additional objects and features of the invention will be appreciated as the details of construction and manner of use are more fully hereinafter described and claimed.

DESCRIPTION OF PREFERRED EMBODIMENTS

Figure 1:
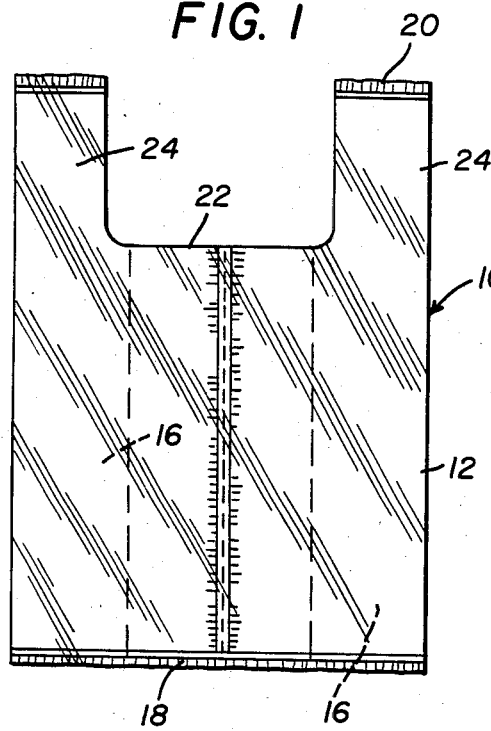
FIG. 1 is a plan view of the bag of the present invention.

Referring now more specifically to the drawings, reference numeral 10 designates the carrier or bag of the invention. As with known bags, the bag 10 can conveniently be fabricated from a tube of thermoplastic material sequentially gusseted, flattened and heat sealed at the opposed upper and lower ends.

The formed bag will thus include opposed overlying front and rear panels defining front and rear walls 12 and 14 with integral outwardly expandable side walls or gussets 16, a heat sealed closed bottom or lower edge 18 and a heat sealed top edge 20. As desired, the basic configuration of the bag 10 can be formed without the side gussets with the sides of the bag defined by a direct heat sealing of the side edges of the front and rear walls 12 and 14 to each other.

The bag 10 is to be in the nature of a "T-shirt" or handle bag. As such, the bag 10 is cut away inwardly and centrally through the heat sealed upper edge 20 thereof for a minor portion of the height of the bag to define both an open bag mouth 22 and a pair of laterally opposed handles 24. As will be appreciated from the drawings, the handle-defining cut will extend through the inner extremities of the upper portions of the opposed gussets 16 to allow for an opening of the formed handles 24. Each of the handles 24 is in turn formed of integrally upwardly extending portions of the front and rear bag walls reinforced by the inwardly underlying upper portions of the gussets 16.

The bag construction as thus far described is generally conventional. The bag 10 of the present invention differs from the conventional thermoplastic grocery bag in that the front and rear walls 12 and 14 are directly bonded to each other vertically along a seal or seam 26 extending between the open loading mouth 22 of the bag and the sealed lower edge or bottom 18 thereof. The front and rear walls 12 and 14 are preferably autogenously bonded to each other, such as by heat sealing, a step which can be easily provided for during the manufacture of the bag.

The central seaming of the front and rear walls 12 and 14 of the bag to each other defines a pair of laterally adjacent upwardly opening compartments 28, each directly accessible through the open mouth 22 of the bag, possibly in conjunction with an outward spreading of the overlying corresponding handle 24.

Figure 2:
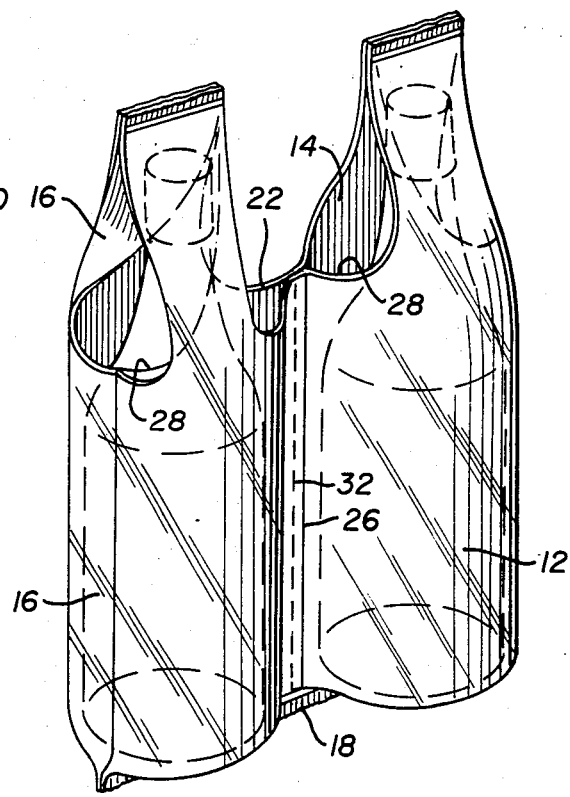
FIG. 2 is a perspective view of the bag with a pair of bottles supported therein.

As previously indicated, the bag 10 of the invention is particularly adapted for the accommodation of a pair of bottles, each received in one of the compartments. When so positioned, and as illustrated in FIG. 2 of the drawings, the bottles are segregated from each other, thus avoiding direct contact therebetween and avoiding any breakage which might be attributed to such contact. The bag 10, when loaded as illustrated in FIG. 2, can now be readily carried in the manner of a conventional plastic grocery bag by merely an inward flexing of the handles 24 toward each other for convenient grasping within one hand.

Figure 4:
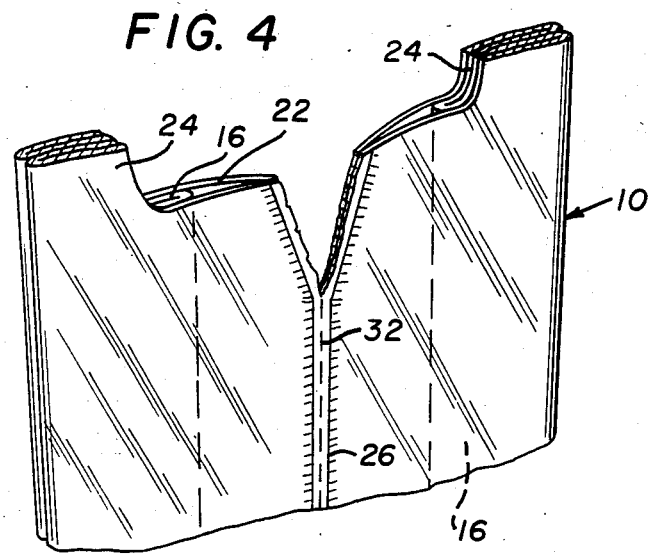
FIG. 4 is a perspective view of a single compartment unit completely severed from the bag and with a bottle therein.
Figure 3:
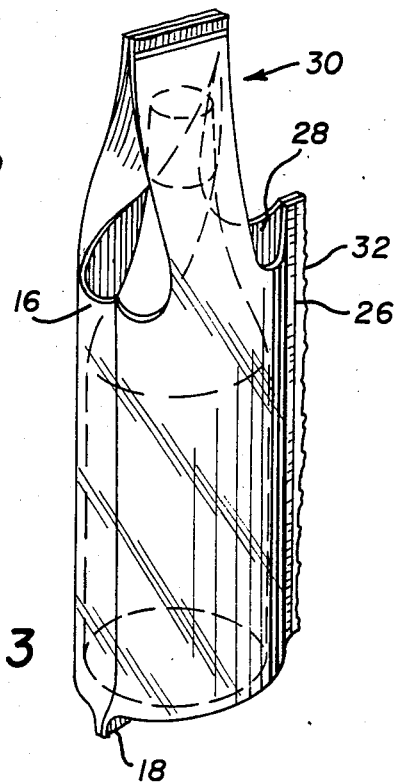
FIG. 3 is a partial perspective view illustrating the manner of severing the individual compartments while maintaining a seamed edge along each compartment.

An additional and particularly significant feature of the invention is the provision for a severing of the two formed bag compartments 28 from each other to provide a carrier or bag unit 30, as illustrated in FIG. 4, to accommodate a single bottle. The severance of the bag 10 into two separate bag units 30 can be provided for by defining a line of severance or weakness 32 vertically along the heat seal or seam 26. This line of severance 32, which may consist of aligned material-weakening perforations, will extend centrally along the seam 26, with the seam 26 being of sufficient width to maintain a positive edge seal along each of the bag units 30 upon a severance thereof. In this manner, the integrity of each of the severed bag units 30 is maintained.

As with the formation of the seam or heat seal 16, the formation of the line of weakness or perforations can be easily effected during bag manufacture through relatively minor equipment modification. As an alternative to providing for a single wide heat seal capable of being centrally perforated or severed, a pair of laterally spaced separate heat seals or seams can be provided with the line of weakness therebetween.

As will be noted particularly in FIG. 4, each of the severed carrier or bag units 30 incorporates one of the handles 24 and defines a self-contained handled carrier or bag for both facilitating a carrying of the bottle and cooperating therewith in confining the bottle and, through the flexible nature of the material of the bag and the weight of the bottle, providing for a intimate retention of the bottle within the bag unit. It will also be recognized that the flexible nature of the bag, either alone or in conjunction with the expanding side gusset 16, will tend to centrally locate the bottle, and hence the load, below the handle 24 to enhance the convenience of the carrier unit.

From the foregoing, it will be appreciated that a bag has been defined which, while requiring no more material than that in a conventional plastic grocery bag, is uniquely compartmented and adapted for the accommodation of multiple bottles in a manner whereby the bottles are segregated from each other within a single carrier to avoid any potential for breakage resulting from direct bottle contact. The bottle segregation results from a direct seaming of the front and rear walls of the bag to each other vertically therealong. With regard to the intimate engagement and direct seaming of the front and rear walls to each other, as noted particularly in FIG. 2, such a relationship provides for a gradual reduction in the spacing between the front and rear walls of an expanded bag toward the central seam. This in turn will actually tend to outwardly space the bottles from the central seam and thus provide a further cushioning effect between the bottles above and beyond that resulting from the width of the seam itself and the front and rear wall material therein.

The ability to sever the bag into separate handled bag units for single bottles is significant in accommodating purchases of single bottles without necessitating either the specific provision of smaller bags capable of accommodating single bottles, or the use of a larger-than-necessary bag normally adapted to accommodate more than one bottle.

I claim:

1. In a plastic "T-shirt" bag comprising generally coextensive overlying flexible front and rear panels, and a closed bottom, said panels defining front and rear overlying side edge-joined walls projecting upwardly from said bottom, an open upward directed bag mouth defined by said walls, said panels further defining a pair of handles integral with said front and rear walls and projecting upwardly from said bag mouth, said handles being laterally spaced from each other with the bag mouth therebetween; the improvement comprising said front and rear walls engaging each other along a linear vertical portion extending between said bottom and said bag mouth intermediate said handles and defining a bottle-receiving vertical compartment with an upwardly-opening compartment mouth to each side of said vertical portion, joinder means bonding said front and rear walls in engagement with each other along said vertical portion, each of said handles generally aligning over a different one of said compartments, and a severable line defined along said joinder means between said closed bottom and said open mouth for enabling selective severing of said compartments, each with a generally aligned handle and open mouth, from each other, said joinder means defining a side edge seam along each severed compartment.

2. The carrier of claim 1 wherein said joinder means comprises a heat seal between said front and rear walls.

3. The carrier of claim 1 wherein said severance line comprises a line of perforations centrally along said joinder means.

* * * * *